United States Patent
Coker

(10) Patent No.: US 9,526,236 B2
(45) Date of Patent: Dec. 27, 2016

(54) FOLDABLE FRAME FOR TRANSPORTING FISHING EQUIPMENT

(71) Applicant: James Coker, Fernandina Beach, FL (US)

(72) Inventor: James Coker, Fernandina Beach, FL (US)

(*) Notice: Subject to any disclaimer, the term of this patent is extended or adjusted under 35 U.S.C. 154(b) by 103 days.

(21) Appl. No.: 14/512,720

(22) Filed: Oct. 13, 2014

(65) Prior Publication Data

US 2015/0113854 A1    Apr. 30, 2015

Related U.S. Application Data

(60) Provisional application No. 61/897,972, filed on Oct. 31, 2013.

(51) Int. Cl.
*A01K 97/06*    (2006.01)
*A01K 97/00*    (2006.01)
*A01K 97/08*    (2006.01)

(52) U.S. Cl.
CPC .............. *A01K 97/00* (2013.01); *A01K 97/06* (2013.01); *A01K 97/08* (2013.01)

(58) Field of Classification Search
CPC ............ A01K 97/06; A01K 97/08; A45C 3/00
USPC .......................................................... 43/54.1
See application file for complete search history.

(56) References Cited

U.S. PATENT DOCUMENTS

| | | | | |
|---|---|---|---|---|
| 2,129,905 A | * | 9/1938 | Bracken | A45C 13/03 211/124 |
| 3,376,047 A | * | 4/1968 | Schuster | B62B 1/042 280/37 |
| 4,311,262 A | * | 1/1982 | Morin | A01K 97/10 206/443 |
| 4,505,495 A | * | 3/1985 | Foss | B62B 3/02 16/113.1 |
| 4,637,626 A | * | 1/1987 | Foss | A45C 13/385 16/113.1 |
| 5,203,815 A | * | 4/1993 | Miller | A01K 97/08 211/149 |
| 5,540,364 A | * | 7/1996 | Krieger | A45F 3/08 224/153 |
| 5,582,458 A | * | 12/1996 | Wildt | A47C 1/143 297/183.5 |
| 5,664,721 A | * | 9/1997 | Homeyer | A01K 97/08 224/149 |
| 5,704,530 A | * | 1/1998 | Scherer | A45F 3/08 224/632 |
| 5,803,519 A | * | 9/1998 | Daigle | A01K 97/08 211/70.8 |
| 5,842,614 A | * | 12/1998 | Morrow | A45F 4/00 224/259 |

(Continued)

*Primary Examiner* — Shin Kim
(74) *Attorney, Agent, or Firm* — Mark Young, PA

(57) ABSTRACT

Foldable frame devices designed to transport fishing equipment and assorted items while functioning as a table and which are capable of being stored in confined spaces are disclosed. In an aspect, a foldable frame device may be carried by a user. The foldable frame device includes a rotating flat surface area which may be moved between a folded position and a usable position. In the folded position, the foldable frame device has a compact profile, thereby occupying a small amount of space for transportation or storage when not in use. In the usable position, the flat surface area extends away from the frame and may support items, such as fishing equipment.

16 Claims, 19 Drawing Sheets

(56) References Cited

U.S. PATENT DOCUMENTS

| | | | | |
|---|---|---|---|---|
| 5,899,527 A * | 5/1999 | Elvidge | A01K 97/22 248/538 |
| 5,975,389 A * | 11/1999 | Braun | A01M 31/02 182/187 |
| 6,079,777 A * | 6/2000 | Simmons | A47C 1/143 108/157.17 |
| 6,082,757 A * | 7/2000 | Lin | A01K 97/22 16/429 |
| 6,179,175 B1 * | 1/2001 | Painter | A45F 3/08 224/153 |
| 6,241,090 B1 * | 6/2001 | Kaplinsky | A01K 97/06 206/315.11 |
| 6,749,215 B2 * | 6/2004 | Perelli | B62B 3/02 16/350 |
| 6,789,809 B2 * | 9/2004 | Lin | B62B 1/12 280/47.18 |
| 6,929,269 B2 * | 8/2005 | Oliver | B62B 1/12 280/35 |
| 6,983,560 B2 * | 1/2006 | Williams | A01K 97/10 248/512 |
| 7,017,940 B2 * | 3/2006 | Hatfull | B62B 1/208 280/63 |
| 7,040,635 B1 * | 5/2006 | Remole | A47C 7/002 248/129 |
| 7,475,888 B2 * | 1/2009 | Craig | F02B 63/04 280/47.18 |
| 8,348,286 B2 * | 1/2013 | Arakawa | B62B 1/14 280/47.19 |
| 8,366,124 B1 * | 2/2013 | Caldwell | B62B 1/20 280/30 |
| 8,505,959 B2 * | 8/2013 | Darling, III | A61G 1/013 280/640 |
| 8,590,921 B2 * | 11/2013 | Benson | B62B 3/008 182/123 |
| 8,596,671 B2 * | 12/2013 | Myrant | B62B 1/208 280/47.18 |
| 8,684,412 B2 * | 4/2014 | Steins | B62D 63/061 280/40 |
| 8,789,836 B2 * | 7/2014 | Umbro | B62B 1/042 280/47.26 |
| 8,943,739 B2 * | 2/2015 | Blake, III | A01K 97/06 206/315.11 |
| 9,282,797 B1 * | 3/2016 | Soto | A45C 11/20 |
| 2003/0038008 A1 * | 2/2003 | Han | A45C 3/00 190/115 |
| 2003/0051388 A1 * | 3/2003 | Barnes | A01K 97/08 43/21.2 |
| 2007/0045973 A1 * | 3/2007 | Grosso | A01K 97/08 280/47.26 |
| 2007/0262567 A1 * | 11/2007 | Benson | B62B 3/008 280/656 |
| 2012/0047791 A1 * | 3/2012 | Blake | A01K 97/06 43/54.1 |

* cited by examiner

FOLDABLE FRAME FOR TRANSPORTING FISHING EQUIPMENT

CROSS REFERENCE TO RELATED APPLICATION

This application claims the benefit of U.S. Provisional Patent Application Ser. No. 61/897,972, filed Oct. 31, 2013, and entitled "Foldable Frame for Transporting Fishing Equipment," the entire contents of which are incorporated herein by reference.

FIELD OF THE DISCLOSURE

The present disclosure relates to foldable frame devices and more particularly foldable frame devices for transporting fishing equipment and assorted items.

BACKGROUND

The statements in this section merely provide background information related to the present disclosure and may not constitute prior art.

Many people of all ages enjoy the activity of fishing. Fishing can take place in various locations such as the beach, lake, river, wharf, dock, jetty, bridge, land outcropping, or the like. In order to participate in the activity of fishing, one must transport the necessary fishing equipment such as buckets, bait, hooks, lines, nets, rods, reels, tackle boxes and the like, to the fishing site. Fishing equipment may be carried by hand or transported by a fishing back pack.

An existing fishing back pack discloses a carrier, rod holders and sand spikes. The carrier may have one or more pockets and one or more removable bags. The pockets and removable bags may be used to carry fishing equipment, a built in cutting board and the like. The carrier may be transported by way of a harness. The carrier may be placed in a stationary position by way of the sand spikes. Rod holders may be configured on either side of the carrier.

The fishing back pack described above allows for transportation of only two fishing rods and reels. The many pockets and removable bags make it difficult to locate items, as well as hampering the size of gear which can be transported. It is also difficult to clean. One may also inadvertently leave behind necessary fishing tackle following the removal of one of the bags. The current fishing back pack cannot be modified to form a flat surface area to hold items such as a fishing bucket. To further complicate matters, the current fishing backpack is bulky and cannot be folded for storage in compact spaces.

Given the foregoing, what is needed is a foldable frame device capable of transporting fishing tackle by an individual. Additionally, foldable frame devices are desired which may be used as multifunctional tables and which are capable of being folded during transportation or storage in small spaces.

SUMMARY

This Summary is provided to introduce a selection of concepts in a simplified form that are further described below in the Detailed Description. This Summary is not intended to identify key features or essential features of the subject matter, nor is it intended to be used to limit the scope of the subject matter.

This disclosure addresses the above-described needs by providing folding frame devices configured to transport assorted items. Assorted items include, but are not limited to, fishing tackle.

Aspects of the present disclosure provide a device configured to facilitate the transportation of assorted items such as fishing tackle and provide for a multifunctional surface area, without taking up significant storage space. Devices configured in accordance with an aspect of the present disclosure are foldable, compact frames that can be carried on the back of a user or can be removably placed on a surface, such as a jetty, a beach, or a bank. Such foldable frame devices can also be folded into compact form during transportation and storage. Products according to the present disclosure are ideal for users who desire to carry fishing tackle to engage in fishing. They may also eliminate the need to transport a separate flat surface area such as a table, thereby decreasing the load that must be carried by the user.

In an aspect, a foldable frame device is configured to increase the amount of items that can be transported by a user during fishing and to conserve space when being stored. Such a foldable frame also renders transporting items easier, especially over difficult terrain such as a trail, sand dunes, or a jetty. Two straps are secured over the shoulders of a user to support the weight of the foldable frame and any objects placed on the foldable frame. The straps are secured at the top of the foldable frame and a rotatable leg is moveably attached to the bottom of the foldable frame. When in use, the leg is placed in an extended position by rotating the leg into a position approximately perpendicular to the body of the frame. Objects to be transported during fishing are placed on the extended leg for transportation. Such configuration allows for transportation of larger items such as buckets. Additionally, such configuration may also function as a large surface area similar to a table for cutting fish, holding fish, baiting hooks and the like. In some aspects, when the device is in use, it is configured to be folded for transportation of slim items such as rods and reels. This configuration may also allow for the foldable frame to be placed onto a surface such as sands, rocks, grass or the like. In an aspect, the foldable frame may further comprise deployable support poles. The deployable support poles may be extended from the foldable frame and support the foldable frame when placed on the ground. When the device is not in use, it is configured to be folded for storage in compact spaces.

Further features and advantages of the systems and apparatus disclosed herein, as well as the structure and operation of various aspects of the present disclosure, are described in detail below with reference to the accompanying figures.

BRIEF DESCRIPTION OF THE DRAWINGS

The features and advantages of the present disclosure will become more apparent from the Detailed Description set forth below when taken in conjunction with the drawings in which like reference numbers indicate identical or functionally similar elements.

DETAILED DESCRIPTION

The present disclosure is directed to devices and attachments which allow for transporting assorted items. Assorted items include, but are not limited to, fishing equipment (e.g. fishing rods and reels, tackle boxes, buckets and the like). Such devices may enable easier transportation of fishing equipment, increased carrying capacity and provide for a flat surface and/or an elevated surface suitable for multifunction use.

In an aspect, a foldable frame device comprises a body, a base and a leg. The foldable frame device is configured to hang from two straps removably wearable on the back of a user, similar to a harness. The body connects to the base. The base is rotatably connected to the leg. The leg rotates from a stored, vertical position to an in use, horizontal position which is perpendicular to the body. Assorted items may be placed on the extended leg to provide the user with a flat multifunctional surface.

In some aspects, the foldable frame device is configured to be folded into condensed form for transportation. In condensed form, the leg is rotated vertically and significantly in parallel with the folding device body. In such aspects, the user may choose to carry or store slender items such as rods and reels.

In some aspects, when the foldable frame is not in use, it is configured to be folded into condensed form for storage. The leg is rotated into the storage position significantly in parallel with the folding device body.

Unless otherwise noted, for the purposes of the present disclosure, "user" and its plural forms refer to adults and children which may participate in fishing or otherwise utilize foldable frame devices of the present disclosure.

Figure 1:
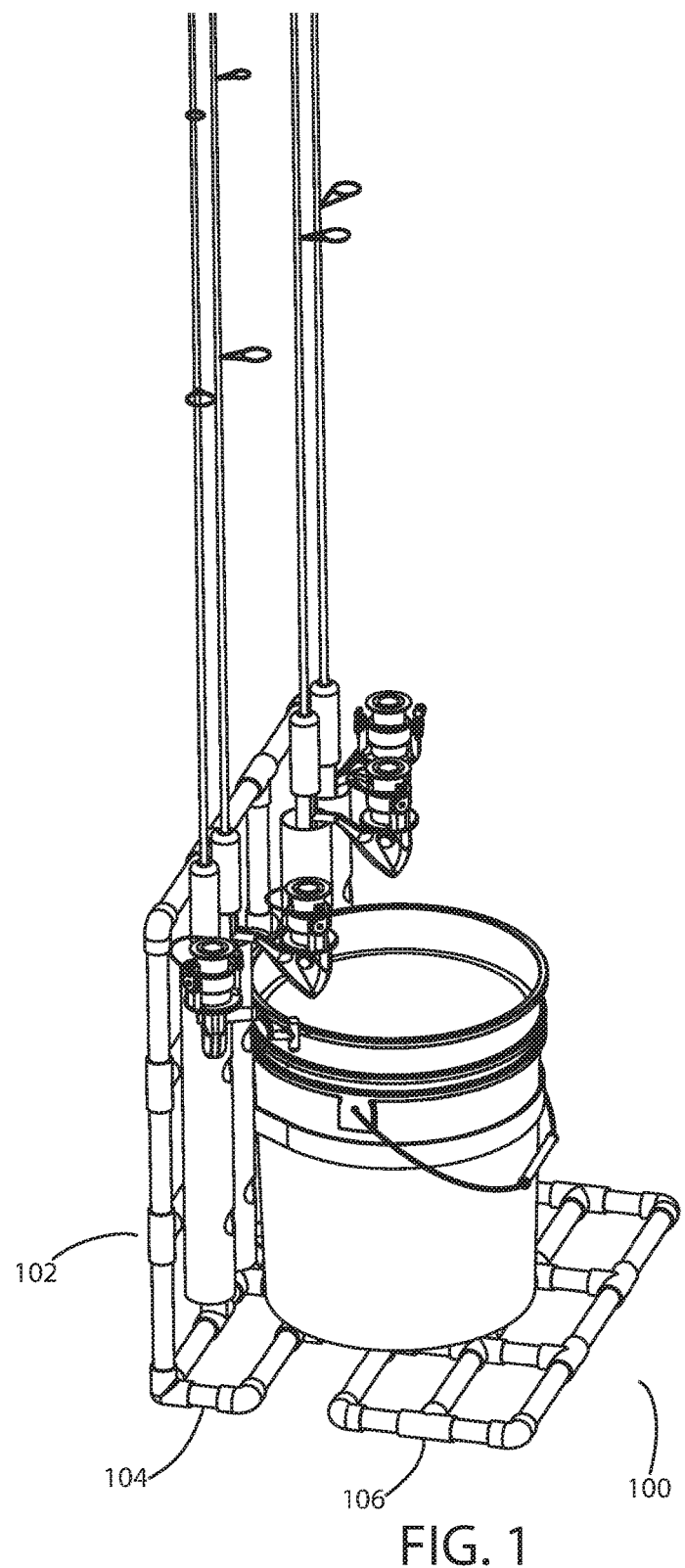
FIG. 1 is a side view of a foldable frame device being used, in accordance with an aspect of the present disclosure.

Referring to FIG. 1, a side view of a foldable frame device 100 being used, in accordance with an aspect of the present disclosure, is shown.

Figure 7:
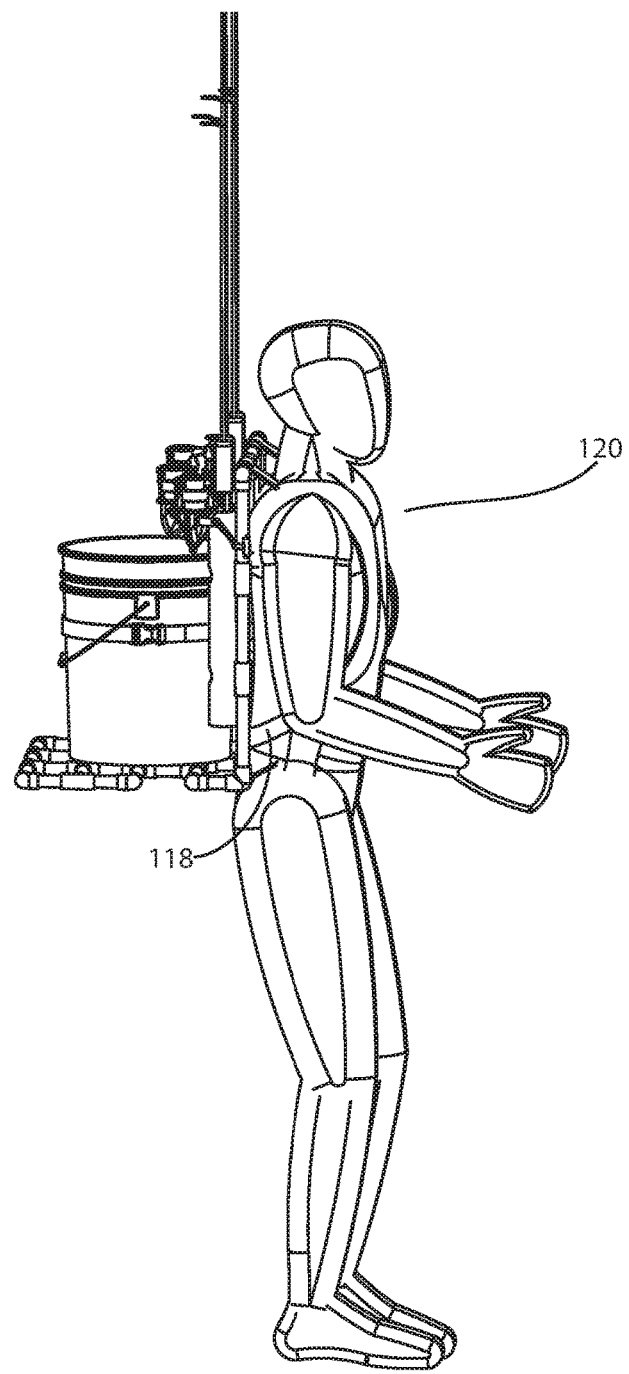
FIG. 7 is a side view of a foldable frame device being worn by a user, in accordance with an aspect of the present disclosure.

Foldable frame device 100 comprises a body 102, a base 104 and a leg 106. Body 102 is a rigid support structure configured to position foldable frame device 100 on the back of a user 120 as shown in FIG. 7 and support the weight of assorted items placed thereon (e.g., during transportation). Body 102 may be constructed of one or more sturdy materials such as plastic, aluminum or the like. In some aspects, the material chosen for body 102 may be configured to be lightweight, enabling folding frame device 100 to be easily picked up and carried each time it is used to transport assorted items.

Figure 2:
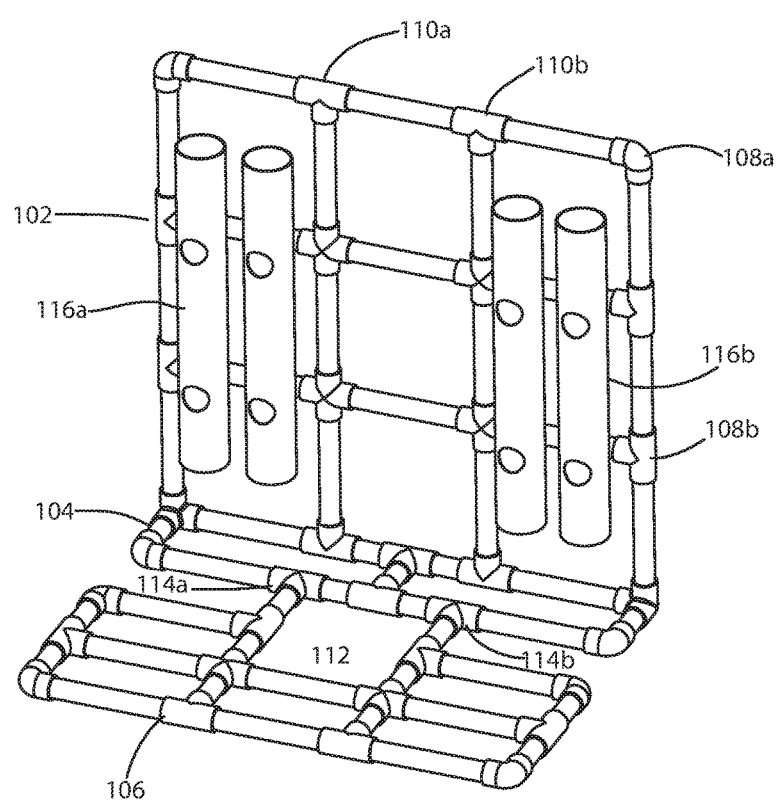
FIG. 2 is a front view of a foldable frame device wherein the device leg is extended, in accordance with an aspect of the present disclosure.

Referring now to FIG. 2, a front view of foldable frame device 100 wherein leg 106 is extended, in accordance with an aspect of the present disclosure, is shown.

Figure 6:
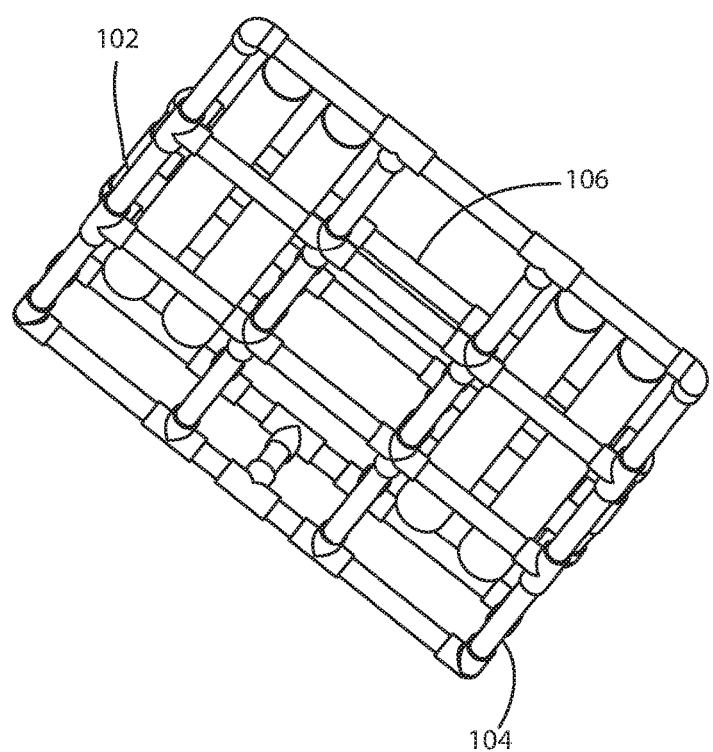
FIG. 6 is a rear perspective view of a foldable frame device wherein the device leg is in the folded position, in accordance with an aspect of the present disclosure.

In an aspect, body 102 comprises one or more cross members 108 (labeled, for clarity, only as cross members 108a-b in FIG. 2) and one or more vertical members 110 (labeled, for clarity, only as vertical members 110a-b in FIG. 2). The back of body 102 may be a flat surface as shown in FIG. 6, configured to contact the back of user 120 as shown in FIG. 7. Vertical member 110 defines the overall length of folding frame 100. The length of vertical member 110 is chosen such that foldable frame device 100 may be placed on the back of user 120. Vertical member 110 may be approximately two to three feet long. In an aspect, four vertical members 110 are horizontally positioned equal intervals apart and rigidly connected by four cross members spaced at equal intervals along the length of cross members 108.

In a second embodiment, two vertical members 110 are positioned approximately two feet apart and rigidly connected by four cross members spaced at equal intervals along the length of vertical members 110, as shown in FIGS. 9-18 and FIG. 20.

In an aspect, cross members 108 are firmly connected to vertical members 110 at end portions of cross members 108. Firm connection may be made by a bolt, screw, bonding agent or other connection means as will be appreciated by those having skill in the relevant art(s) after reading the description herein. The firm connection may be a permanent or removable connection.

Cross members 108 and vertical members 110 may be constructed of two to three-inch bars. These bars may be made of metal, aluminum or some other suitable sturdy material.

Base 104 comprises the bottom cross member 108 of body 102, one or more cross members 108 and one or more vertical members 110. Cross members 108 are firmly connected to vertical members 110 at end portions of cross members 108. The length of base 104 is equal to the length of cross members 108. The width of base 104 may be approximately one fourth the length of the vertical members 110 located on body 102. Base 104 is configured to connect to leg 106 at rotatable connection 114. Rotatable connection 114 (labeled as rotatable connection 114a-b in FIG. 2) may be comprised of one or more hinges or other means as will be appreciated by those skilled in the relevant art(s) after reading the description herein for suitable rotation.

Figure 4:
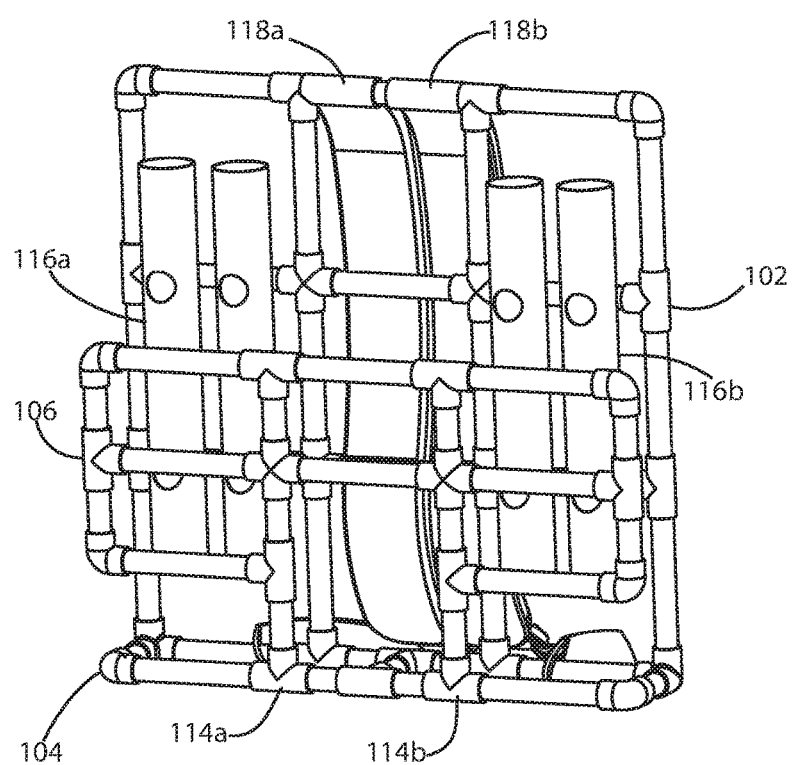
FIG. 4 is a front view of a foldable frame device wherein the device leg is in the folded position, in accordance with an aspect of the present disclosure.
Figure 5:
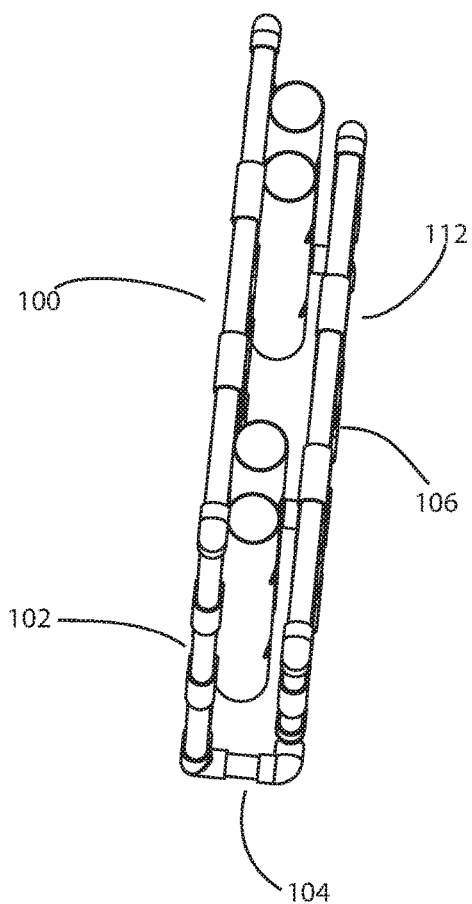
FIG. 5 is a side view of a foldable frame device wherein the device leg is in the folded position, in accordance with an aspect of the present disclosure.

In an aspect, base 104 is configured to transport assorted items during fishing. In another aspect, base 104 is configured to make contact with a surface such as the ground, sand, rocks or the like. Leg 106 comprises a flat surface area 112 and one or more rotatable connectors 114. In an aspect, leg 106 may be configured so that the length of leg 106 is approximately one-third the length of body 102 as shown in FIGS. 4, 5 and 6. Leg 106 may comprise two or more cross members and two or more vertical members of various arrangements as shown in FIG. 2. Flat surface area 112 is configured to support assorted items during fishing. In an aspect, flat surface area 112 may comprise a sturdy material such as plastic, mesh or the like, as may be appreciated by those skilled in the relevant art(s) after reading the description herein. Flat surface area 112 may be placed in two positions: a usable position wherein leg 106 is perpendicular to body 102 (FIG. 2) and a folded position (FIG. 4) wherein leg 106 is parallel to body 102.

Holder 116 (labeled, for clarity, only as holder 116a-b in FIG. 2) is configured to attach to body 102 at cross member 108. Holder 116 may be configured to support assorted items such as rods and reels during fishing. Holder 116 may be constructed of one or more sturdy materials such as plastic, metal or steel. Holder 116 may be shaped similar to that of a cylinder. Holder 116 may vary in length, width and height. Holder 116 may be connected to cross members 108 by bolts, screws or other adhesive, as may be appreciated by those having skill in the relevant art(s) after reading the description herein. In an aspect, foldable fame device 100 comprises four holders 116. In alternative aspects, foldable frame device may comprise more or less holders 116.

In an aspect, foldable frame device 100 may further comprise deployable support poles (not shown). The deployable support poles may be extended from foldable frame device 100, elevating and supporting foldable frame device when placed on the ground.

Figure 3A:
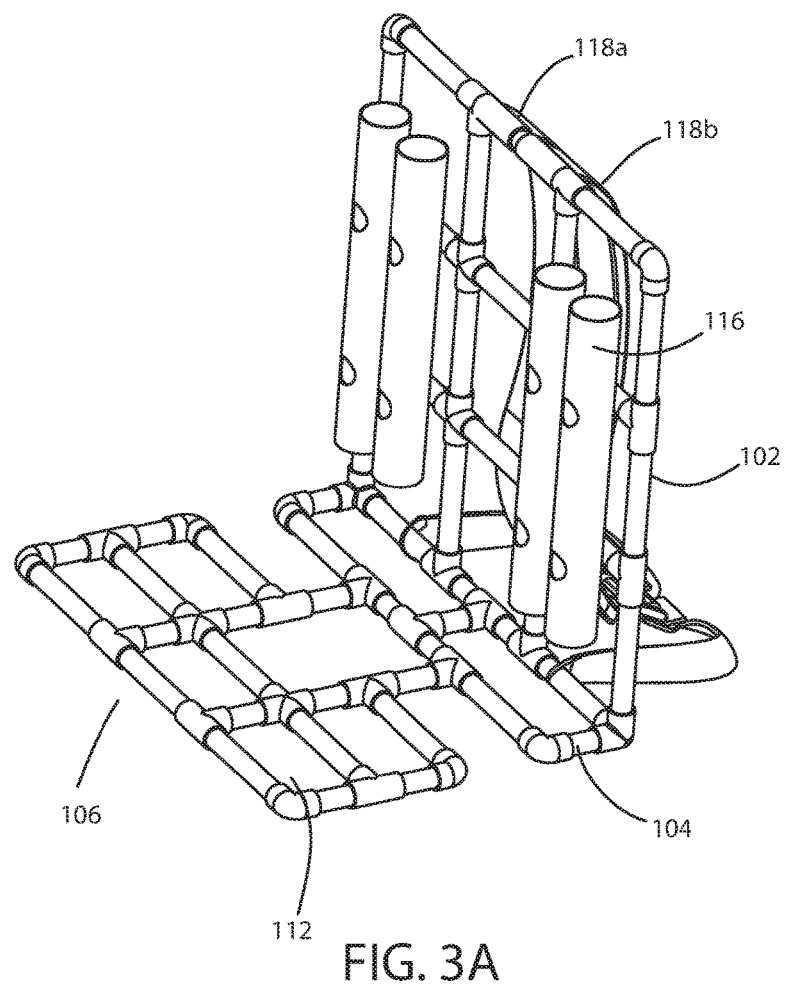
FIGS. 3A and 3B are three quarter views of a foldable frame device wherein the device leg is extended, in accordance with an aspect of the present disclosure.
Figure 3B:
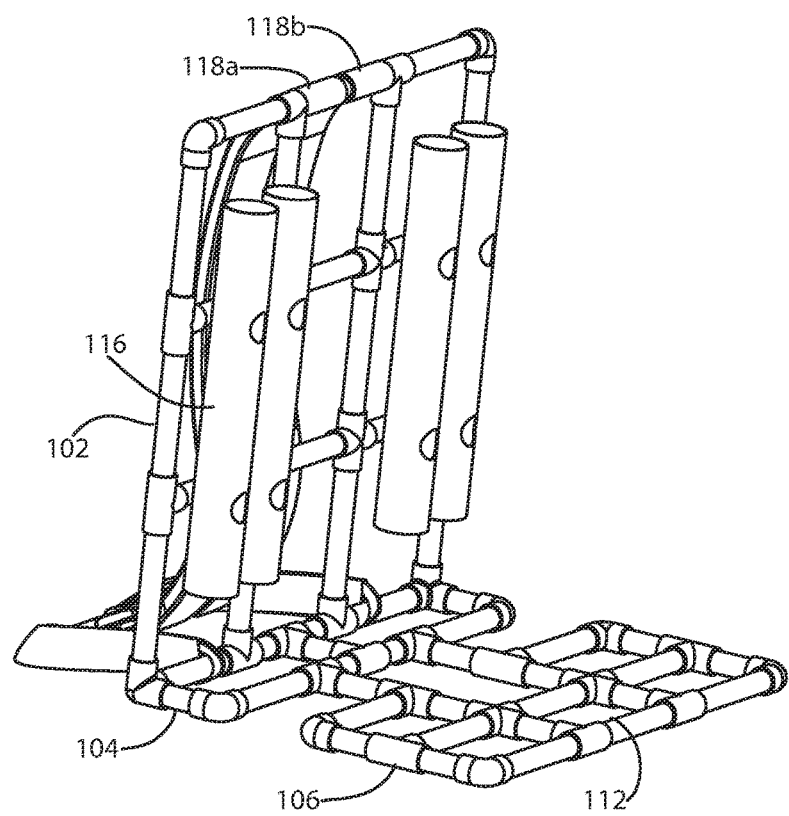

Referring now to FIGS. 3A and 3B, a three quarters view of a of a foldable frame device 100, displaying strap 118 (labeled as straps 118a-b in FIGS. 3A-B), in accordance with an aspect of the present disclosure is shown.

Figure 8:
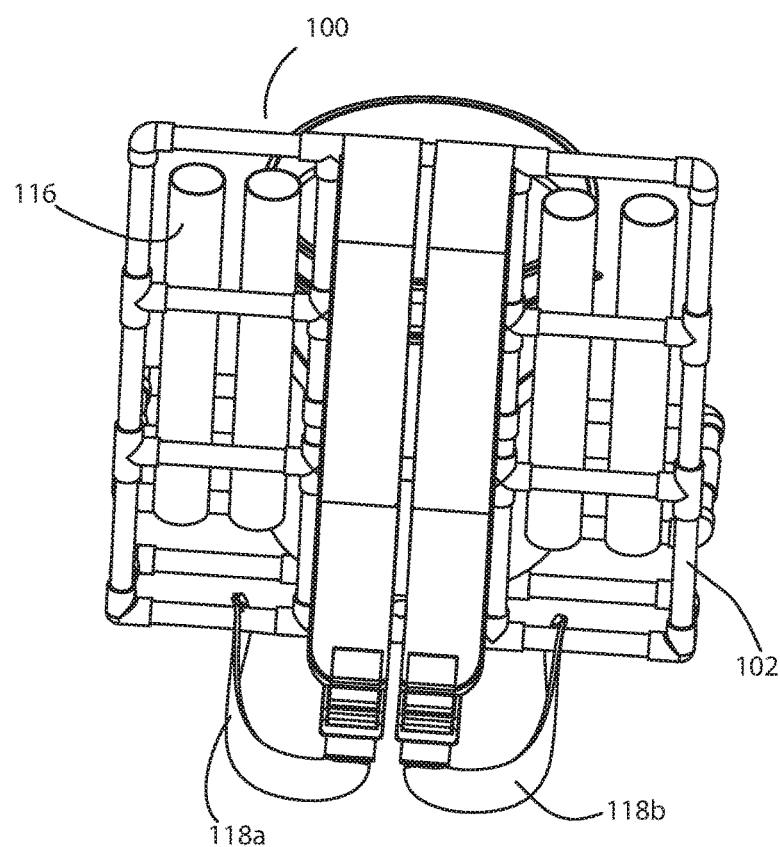
FIG. 8 is a rear view of a foldable frame device, in accordance with an aspect of the present disclosure.

Strap 118 is removably attached to foldable frame 100 at, for example, the top cross member 108 of body 102. Straps 118 may be placed equal distances apart on top cross member 108 so as to maintain the balance of foldable frame 100. Straps 118 are adapted to removably connect foldable frame device 100 to a user 120. Straps 118 may be curved extending over the shoulders of user 120 and underneath the armpits of user 120, similar to a harness, backpack, or the like as shown in FIGS. 7 and 8. Straps 118 may be positioned evenly under the armpits to sustain the weight of the assorted items placed on foldable frame 100. In some aspects, straps 118 may be designed with varying widths. Straps 118 may be adjustable for varying the positioning of foldable frame 100 on the back of user 120. Straps 118 may be constructed of one or more soft materials such as nylon jersey or mesh. In alternative aspects, one or more handles (not shown in FIGS. 3A and 3B) may be securely attached to top cross member 108 of body 102, either removably or permanently, instead of or in addition to straps 118, to facilitate the movement of device 100 via being gripped and carried by a hand of user 120.

Referring now to FIG. 4, a front view of a foldable frame device 100 wherein leg 106 is in the folded position, in accordance with an aspect of the present disclosure is shown.

FIG. 4 depicts leg 106 and flat surface area 112 in its folded position. In some aspects, foldable frame device 100 may be folded at rotatable connector 114 (labeled as rotatable connection 114a-b in FIG. 4) for transportation or storage of slim items such as rods and reels or the like. In other aspects, foldable frame device 100 may be folded at rotatable connector 114 for storage in compact spaces. As shown in FIG. 5, foldable frame device 100 occupies a volume with a similar height, width and approximately three quarters the thickness when folded.

Foldable frame 100 may be used with a variety of lengths and widths of cross members 108 and vertical members 110.

Figure 9:
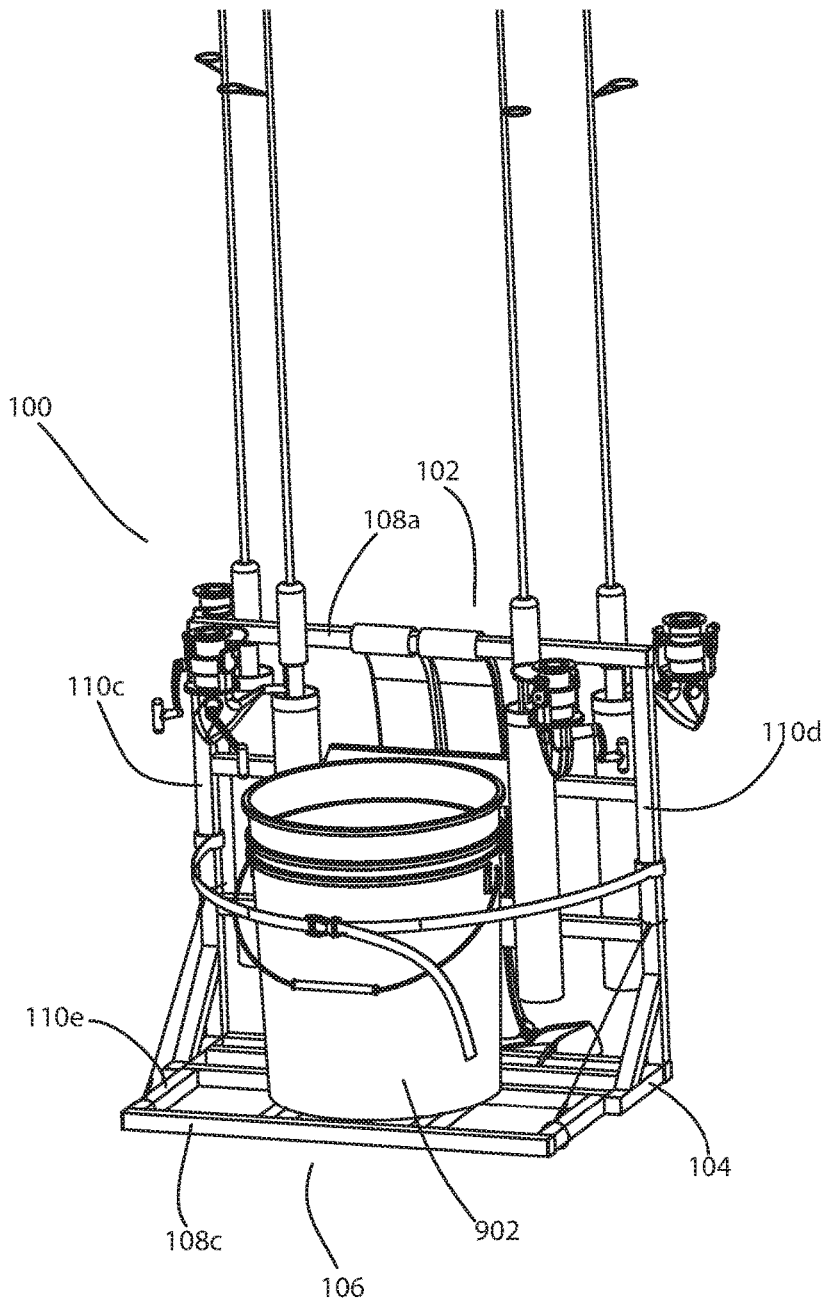
FIG. 9 is a perspective view of a second embodiment of a foldable frame device being used, in accordance with an aspect of the present disclosure.

Referring now to FIG. 9, a perspective view of a second embodiment of a foldable frame device 100 being used, in accordance with an aspect of the present disclosure, is shown.

The second embodiment of device 100 is substantially similar to the above described version of device 100 and has many of the same parts and components, with a slightly different configuration. In an aspect, the second embodiment of foldable frame device 100 comprises two vertical members 110 (labeled as 110c-d in FIG. 9) positioned approximately two feet apart and rigidly connected by four cross members 108 (labeled only as 108a in FIG. 9, for clarity) spaced at equal intervals along the length of vertical members 110. In such an aspect, leg 106 may contain two cross members 108 (labeled only as 108c in FIG. 9, for clarity) and four vertical members 110 (labeled only as 110e in FIG. 9, for clarity), or alternative arrangements as may be appreciated by those having skill in the relevant art(s) after reading the description herein.

Figure 10:
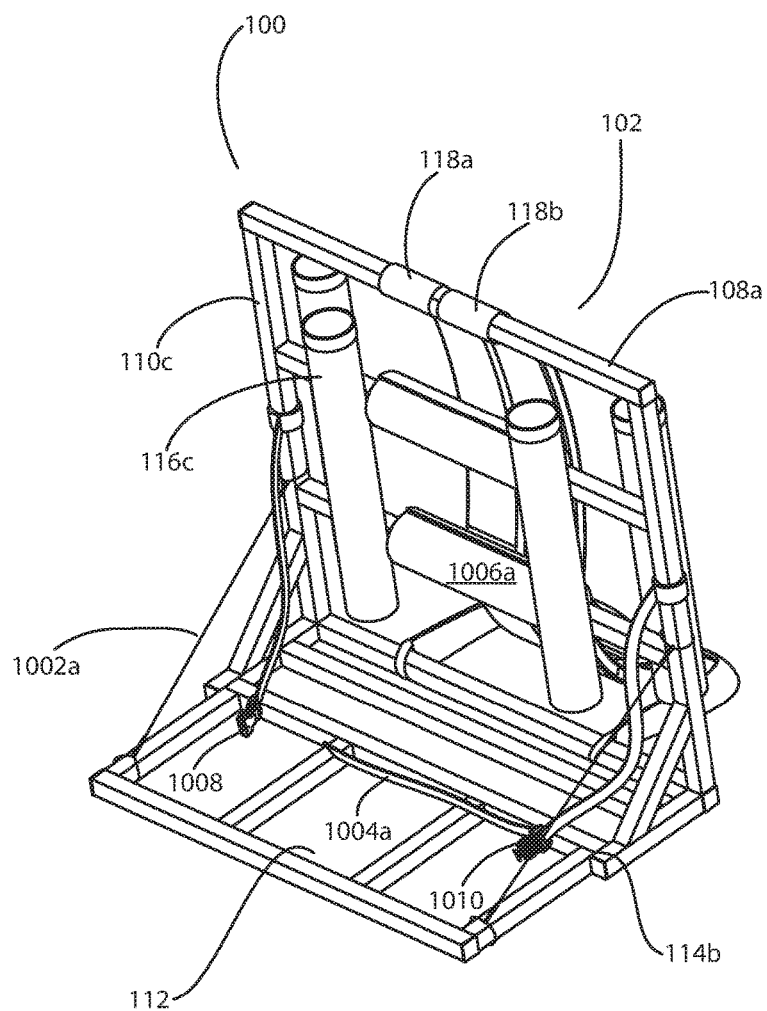
FIG. 10 is a three quarter view of a foldable frame device wherein the device leg is extended, in accordance with an aspect of the present disclosure.
Figure 11:
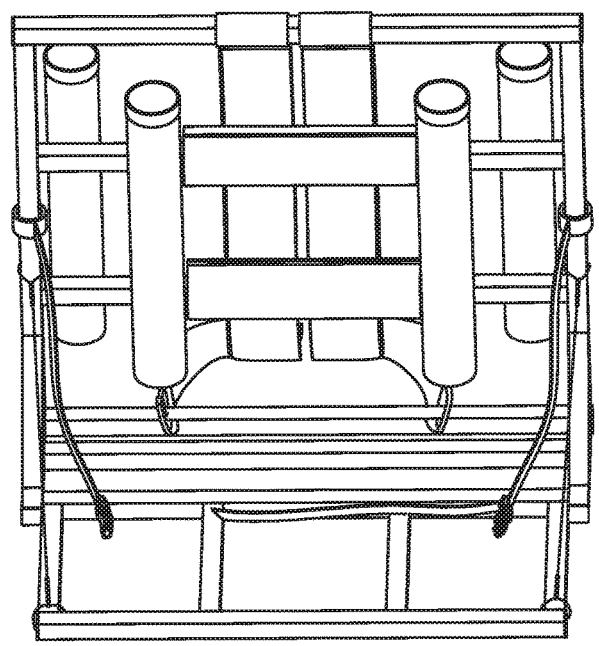
FIG. 11 is a front view of a foldable frame device wherein the device leg is extended, in accordance with an aspect of the present disclosure.
Figure 12:
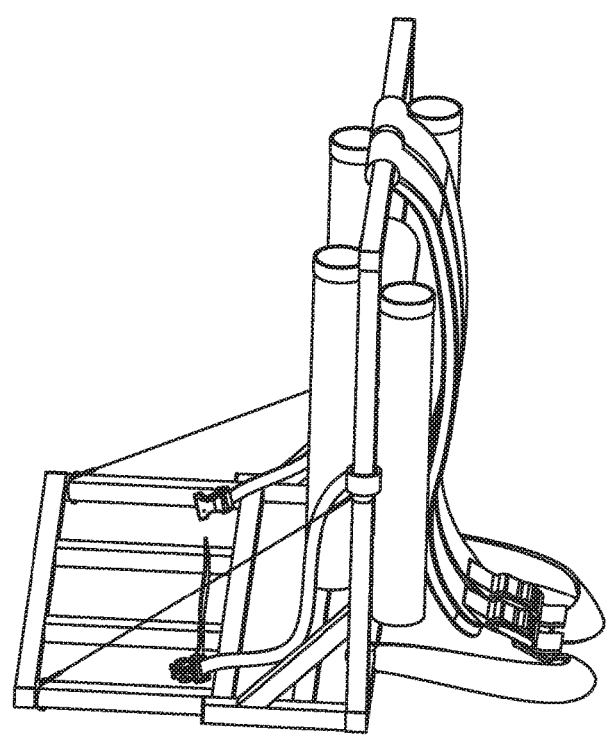
FIG. 12 is a side perspective view of a foldable frame device wherein the device leg is extended, in accordance with an aspect of the present disclosure.
Figure 13:
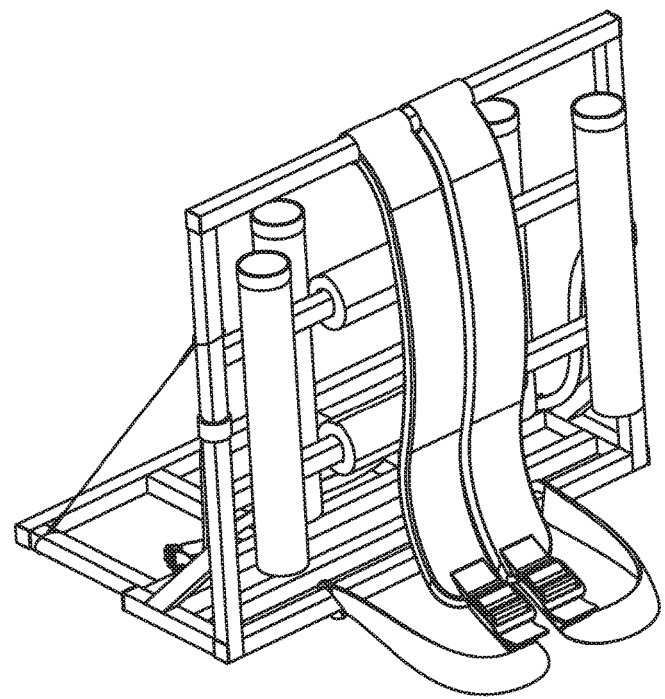
FIG. 13 is a rear perspective view of a foldable frame device wherein the device leg is extended, in accordance with an aspect of the present disclosure.
Figure 14:
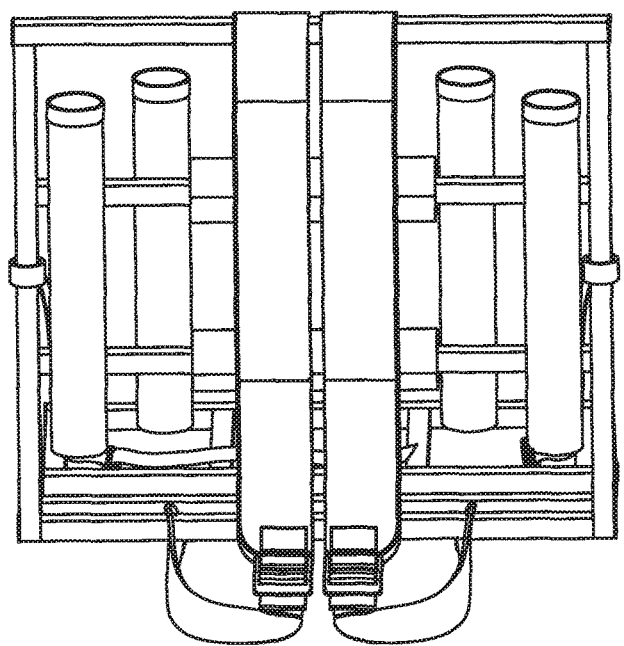
FIG. 14 is a rear view of a foldable frame device wherein the device leg is extended, in accordance with an aspect of the present disclosure.

Referring now to FIG. 10, a three quarter view of a second embodiment of a foldable frame device 100 wherein the device leg 106 is extended, in accordance with an aspect of the present disclosure, is shown.

The second embodiment of device 100 includes additional items. Specifically, the second embodiment of device 100 may further include at least one flexible member 1002 (labeled only as 1002a in FIG. 10, for clarity); at least one belt component 1004 (labeled only as 1004a in FIG. 10, for clarity); at least one padding element 1006 (labeled on only as 1006a in FIG. 10, for clarity); female clasping mechanism 1008; and a male clasping mechanism 1010.

Figure 15:
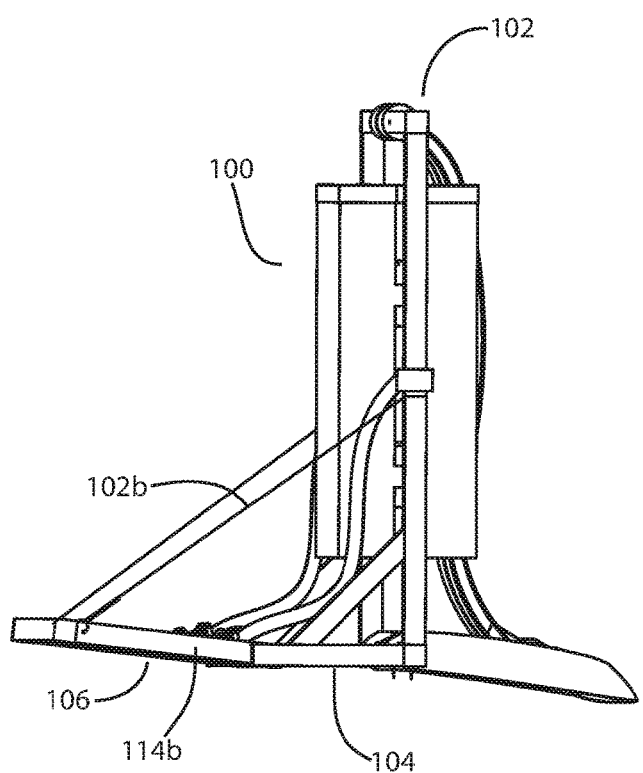
FIG. 15 is a side view of a foldable frame device wherein the device leg is extended, in accordance with an aspect of the present disclosure.

Flexible member 1002 may securely attach to a vertical member 110 or a cross member 108 of body 102 at one end and a vertical member 110 or a cross member 108 of leg 106 at the opposite end. Flexible member 1002 may comprise a cable, wire, rope, or similar element with an appropriate tensile strength as will be appreciated by those skilled in the relevant art(s) after reading the description herein as being capable of supporting the weight of leg 106 and any one or more of a variety of objects that may be placed thereon, including buckets, fishing gear, and the like. Furthermore, flexible member 1002 may function to prevent leg 106 from rotating more than approximately 90 degrees relative to body 102 when leg 106 is in the extended position, as shown in FIG. 15. In some aspects, a stopping and/or locking mechanism is integrated with rotatable connector 114 in order to prevent movement of leg 106 past the approximately 90 degree point relative to body 102. In such aspects, flexible member 1002 may or may not be included with device 100. In yet some further aspects, the length of flexible member 1002 and/or the configuration of a stopping and/or locking mechanism integrated with rotatable connector 114 may be such as to vary the angle at which leg 106 may be extended relative to body 102, either less than or greater than 90 degrees.

Figure 16:
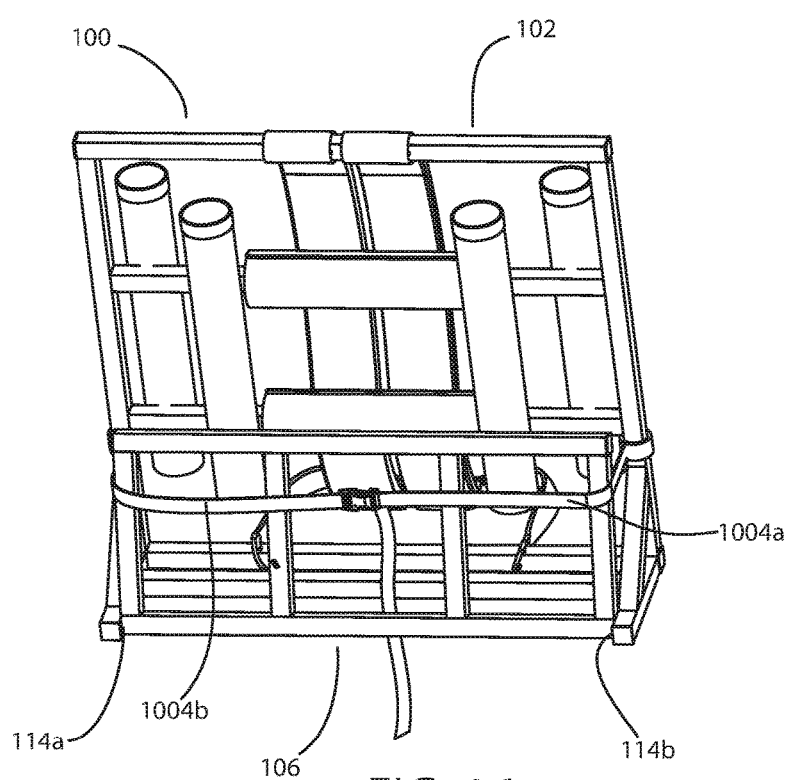
FIG. 16 is a front view of a foldable frame device wherein the device leg is in the folded position, in accordance with an aspect of the present disclosure.

Belt component 1004 may be securely attached to vertical members 110 positioned at the outermost opposing sides of body 102. Belt component 1004 may be integrated with one or more clasping mechanisms, such as, by way of example and not limitation, female clasping mechanism 1008 and male clasping mechanism 1010. Belt component 1004 may comprise a webbed fabric, nylon jersey, mesh, or similar material as may become apparent to those skilled in the relevant art(s) after reading the description herein as capable of restraining on object positioned on flat surface area 112, such as bucket 902 (shown in FIG. 9) and the like, when the clasping mechanisms 1008 and 1010 are secured within each other. Additionally, belt component 1004 may keep leg 106 in its upright folded position, as shown in FIG. 16.

Figure 18:
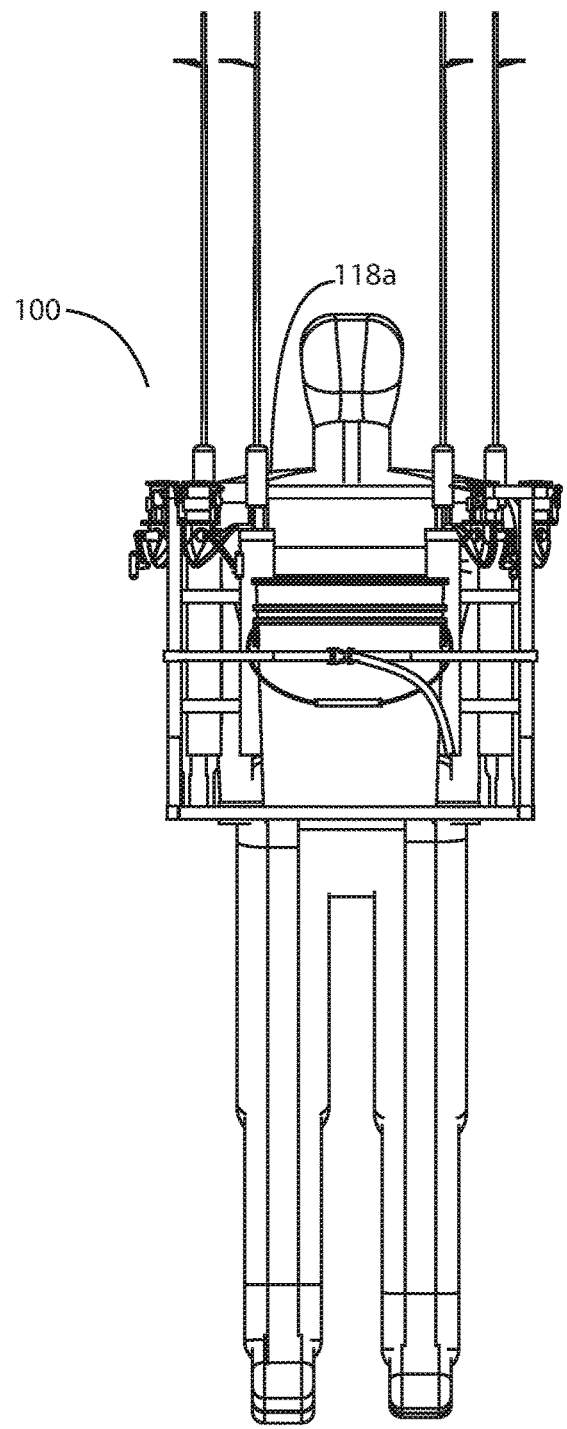
FIG. 18 is a rear view of a foldable frame device being worn by a user, in accordance with an aspect of the present disclosure.

Padding element 1006 may comprise foam-like material, or any other similar material that is soft to the touch as will be appreciated by those skilled in the relevant art(s) after reading the description herein. Padding element 1006 may provide a comforting barrier between vertical member 110 and/or cross member 108 and the back of user 120 when device 100 is worn thereon for transportation, as shown in FIGS. 18 and 21.

Figure 17:
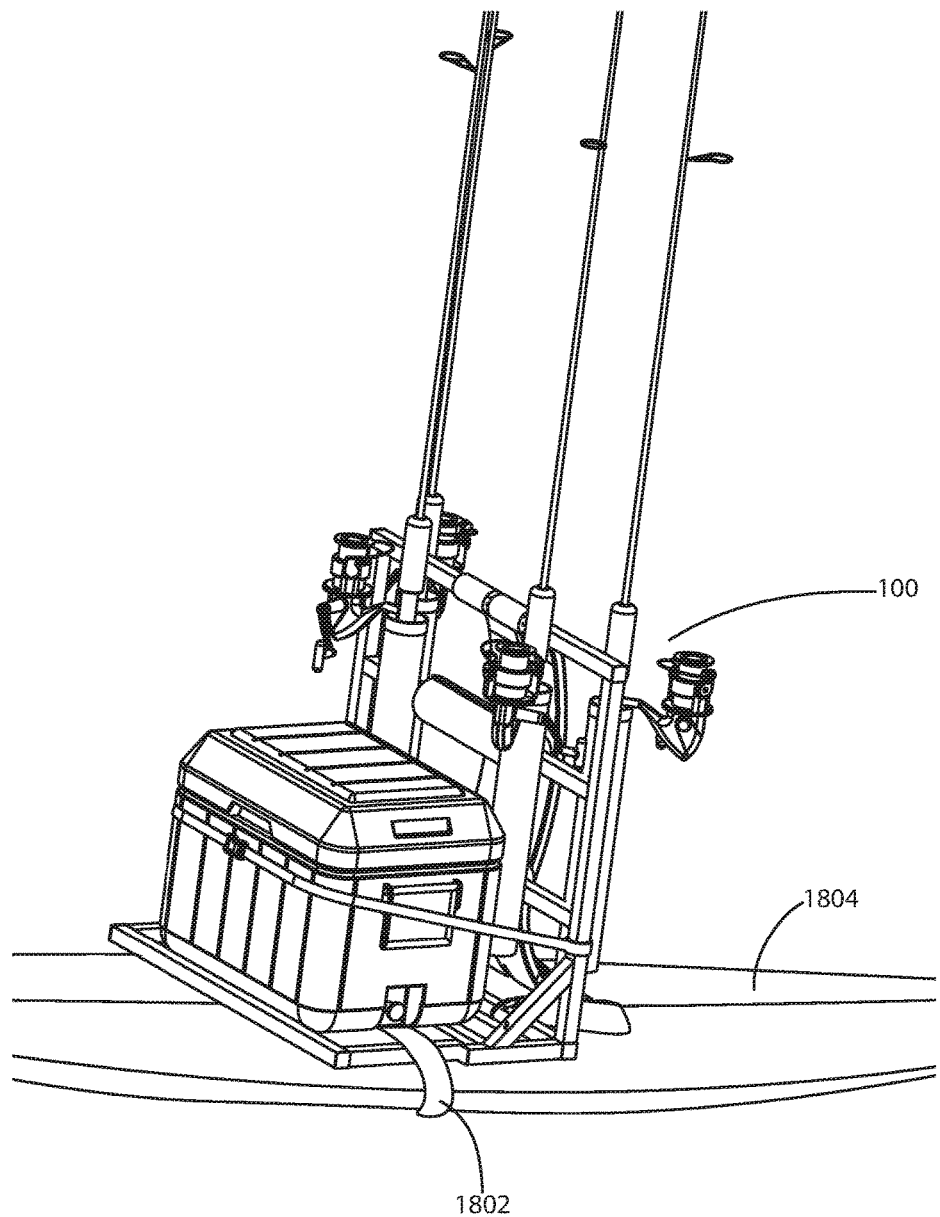
FIG. 17 is a three quarter view of a foldable frame device being used atop a paddleboard, in accordance with an aspect of the present disclosure.

Referring now to FIG. 17, a three quarter view of a second embodiment of a foldable frame device 100 being used atop a paddleboard 1804, in accordance with an aspect of the present disclosure, is shown.

In some aspects, device 100 may include an additional strap 1802. Strap 1802 may comprise material similar to belt component 1004 and be used to removably secure device 100 to a variety of surfaces/objects, such as, by way of example and not limitation, paddleboard 1804. In some aspects, one or more straps 118 and/or belt component 1004 may be removed from device 100 and reattached to different parts thereof in order to secure device 100 to surfaces/objects in conjunction with/instead of strap 1802.

In some aspects, device 100 may be configured as a tree stand. Device 100 may include one or more attachment devices suitable for securely, removably connecting device 100 to a tree at a desired height including a tree strap, pitons, and the like. Device 100 may further include a seat cushion and/or back supports for comfort.

While various aspects of the present disclosure have been described above, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures.

Further, the purposes of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of the technical disclosure. The Abstract is not intended to be limiting as to the scope of the present disclosure in any way.

What is claimed is:

1. A foldable frame device configured to transport fishing equipment on a user back, the foldable frame device comprising:
    a body comprising a vertically oriented, rigid, open framework comprising: a top body portion; a plurality of horizontally-oriented cross members; and a bottom body portion;
    at least one fishing rod holder mounted to one of the plurality of crossmembers;
    a base fixed to the bottom body portion and extending perpendicularly therefrom, the base having a proximal end and an opposite distal end, the proximal end being coterminus with the bottom body portion;
    a shelf rotatably connected to the base at the distal end, the shelf rotating away from the body between a substantially vertical stored position and an extended position with the shelf substantially perpendicular to the body and substantially coplanar with the base, the shelf having a pivoting end and an opposite free end, the pivoting end of the shelf being rotatably connected to the base at the distal end;
    a stop mechanism limiting rotation of the shelf from the vertical stored position to the extended position, with the shelf substantially perpendicular to the body and substantially coplanar with the base in the extended position; and
    a pair of shoulder straps;
    wherein, when the shelf is in the extended position, the base and the shelf form a supporting surface for transporting objects; and
    wherein, when the shelf is in the stored position, the shelf is offset from the at least one fishing rod holder.

2. The foldable frame device of claim 1, wherein the shelf is connected to the base via a pair of rotatable connectors, the stop mechanism selected from the group consisting of: a stopper and a locking device.

3. The foldable frame device of claim 1, the shelf comprising a plurality of bars, at least two of the bars being centrally located and spaced less than one foot apart.

4. The foldable frame device of claim 3, the centrally located bars configured to support a five gallon bucket.

5. The foldable frame device of claim 1, wherein the pair of shoulder straps are attached to the top body portion.

6. The foldable frame device of claim 5, further comprising a waist belt attached to the frame at the bottom body portion.

7. The foldable frame device of claim 6, the frame further comprising at least one back padding element encasing a portion of one of the plurality of crossmembers.

8. The foldable frame device of claim 7, the frame having a frame width greater than a user shoulder width.

9. The foldable frame device of claim 8, the frame width being two feet.

10. The foldable frame device of claim 9, the frame further comprising an adjustable retaining strap for retaining objects, the retaining strap including a clasping mechanism.

11. The foldable frame device of claim 1, the stop mechanism comprising a pair of retaining wires interconnecting the body and the shelf, configured to support the shelf and restrict shelf movement.

12. The foldable frame device of claim 11, wherein each of the retaining wires are constructed from braided metal.

13. The foldable frame device of claim 11, further comprising a pair of angled reinforcement members interconnecting the second base portion and the bottom body portion.

14. The foldable frame device of claim 1, comprising a first pair and a second pair of the at least one fishing rod holders, the first pair mounted on a front side of one of the plurality of crossmembers, the second pair mounted on a back side of one of the plurality of crossmembers.

15. The foldable frame device of claim 14, the first pair of the at least one fishing rod holders spaced approximately one foot apart.

16. The foldable frame device of claim 14, each of the fishing rod holders including a top fishing rod holder portion coated with a polymer.

* * * * *